United States Patent [19]

Pullen et al.

[11] Patent Number: 5,330,671
[45] Date of Patent: Jul. 19, 1994

[54] FLUID, FORMULATION AND METHOD FOR COAL DUST CONTROL

[76] Inventors: Erroll M. Pullen; Melvyn D. Pullen; Carol Pullen, all of 16 Cordia Crescent, Umhlanga Rocks, South Africa

[21] Appl. No.: 944,089

[22] Filed: Sep. 11, 1992

[51] Int. Cl.$^5$ .............................. C09K 3/22; C10L 5/00
[52] U.S. Cl. ........................................ 252/88; 44/602; 44/624; 44/627; 252/162; 252/170
[58] Field of Search ................. 252/88, 162, 170, 173, 252/549, 530; 44/602, 501, 624, 627

[56] References Cited

U.S. PATENT DOCUMENTS

| | | | |
|---|---|---|---|
| Re. 29,649 | 5/1978 | Farnsworth | 252/162 |
| 1,995,598 | 3/1935 | Archibald | 44/602 |
| 1,995,603 | 3/1935 | Cunningham | 44/602 |
| 3,367,878 | 2/1968 | Mankowich | 252/162 |
| 4,175,062 | 11/1979 | Disch et al. | 252/535 |
| 4,362,638 | 12/1982 | Caskey et al. | 252/162 |
| 4,425,252 | 1/1984 | Cargle et al. | 252/88 |
| 4,561,905 | 12/1985 | Kittle | 252/88 |
| 4,620,937 | 11/1986 | Dellutri | 252/162 |
| 4,929,378 | 5/1990 | Morita et al. | 252/105 |
| 4,944,892 | 7/1990 | Leathers et al. | 252/173 |
| 4,971,720 | 11/1990 | Roe | 252/88 |

FOREIGN PATENT DOCUMENTS 1-144495 6/1989 Japan .

*Primary Examiner*—Prince Willis, Jr.
*Assistant Examiner*—J. Silbermann
*Attorney, Agent, or Firm*—A. W. Fisher, III

[57] ABSTRACT

An aqueous, coal dust suppression fluid comprising one or more surfactants and at least one high terpene-containing natural oil. The coal dust suppression fluid can be used in a formulation of water dosed with the aqueous dust suppression fluid for the abatement of coal dust. A method is described for the abatement of coal dust using the formulation.

21 Claims, No Drawings

FLUID, FORMULATION AND METHOD FOR COAL DUST CONTROL

BACKGROUND OF THE INVENTION

The invention relates to aqueous, coal dust suppression fluids, and formulations for the abatement of coal dust containing water dosed with dust suppression fluids. Furthermore, the invention relates to methods for the abatement of coal dust.

Dust suppression is the reduction of the extent to which finely divided solid particulate material becomes suspended in the air. A variety of materials such as coal, sulfur, phosphate, clay, and other finely divided ores and minerals, generate dust in transfer and handling operations during mining, transportation, storage, and use.

Dust is a particularly severe safety and health hazard in coal mining, handling, and storage operations. Coal often chips into small fragments by the action of wind and rain, frictional movement due to motion in transit, and abrasion in handling. Respirable coal dust has a particle size of less than about 10 microns and its inhalation can lead to pneumoconiosis, i e., "black lung disease". Also, dust explosions due to spontaneous combustion may occur when the dust is confined to a small air space such as in coal mining operations.

It is known to suppress coal dust in mines by spraying with various aqueous systems containing chemical additives to improve working conditions and reduce the toxicological risks and explosion hazards. For example, U.S. Pat. No. 4,425,252 describes a method to abate coal dust using an anionic surfactant, preferably sodium dodecyclbenzene sulphonate and a nonionic surfactant, preferably a polyethoxylated nonylphenol, in an aqueous formulation. The method comprises spraying the coal dusty area with a formulation comprising water containing up to 0.1% by weight of the mixture of the anionic surfactant, i.e., a water soluble salt of an alkyl aryl sulfonic acid and nonionic surfactant having an HLB of from 10 to 16. Optimally, the mixture contains one or more cosolvents generally of the class of alkylene glycol monoalkyl ethers, $C_2$ to $C_5$ alkanols and mixtures thereof.

Furthermore, several techniques have been developed utilizing foamable compositions for suppressing coal dust. For example, U.S. Pat. No. 4,551,261 describes a foam comprising water, a foaming agent, and an elastomeric water insoluble polymer. A variety of anionic and nonionic surfactants and detergent wetting agents are described as useful foaming agents, and a variety of elastomeric and water insoluble synthetic organic polymer binders are described as useful elastomeric water insoluble polymers.

U.S. Pat. No. 4,971,720 describes a method for suppressing dust process emissions. The method utilizes a foaming agent which may be a low salt tolerant surfactant selected from salts of fatty acids, alkyl sulphates, and alkyl aryl sulphonates.

U.S. Pat. No. 4,561,905 describes a coal dust suppression mixture of oil, water and a surfactant in the form of an emulsion that is diluted and foamed. The foam is then sprayed into a falling mass of coal. The oils suitable for use are described as heavy process oils and include asphalt dissolved in a moderately heavy oil, residual flush oils or relatively high viscosity fuel oil. The preferred oils have a viscosity in the range of from approximately 600 to 7,000 SUS at 38° C., a pour point in the range of approximately −18° to 21° C., a molecular weight of at least 300 and a boiling point of at least 204° C.

Thus, various techniques have been developed to suppress coal dust, and many of the techniques are effective for reducing that dust. However, there is still a need for improvement in coal dust suppression, and many of the prior techniques were developed without a need to address problems associated with modern coal mining practices.

SUMMARY OF THE INVENTION

Accordingly, it is the primary object of the invention to provide an effective, novel coal dust suppression fluid, which also effectively addresses certain problems associated with modern coal mining practices. For example, most modern, state-of-the-art, continuous coal mines utilize scrubbers which tend to clog. Thus, there is a need for a material which not only effectively reduces airborne dust, but also effectively assists in keeping spray nozzles and scrubber screens clean and unclogged. In addition, coal suppression fluids often have secondary uses and are frequently circulated through mine equipment underground as a heat exchange fluid. However, water jackets on that equipment tend to accumulate mineral deposits such as calcium deposits, drastically reducing cooling efficiency. Hence, it is a further object of the invention to provide a coal dust suppression fluid which increases cooling efficiency when used as a heat exchange fluid by maintaining the water jackets on the equipment underground free of mineral deposits such as calcium deposits.

Many of the chemical additives used in coal dust suppression fluids are also very expensive. It is therefore another object of the invention to provide a coal dust suppression fluid which reduces the need for costly chemical additives. Furthermore, many of the chemicals used in coal dust suppression are themselves toxic to humans to some degree, and destructive of the environment. Thus, another object of the invention is to provide a coal dust suppressing fluid which is less toxic to humans and is environmentally acceptable thereby reducing process water contamination; water which ultimately will find its way to local streams, rivers and lakes.

Another problem associated with the prior art is the vast amount of process water which is necessary for coal dust suppression. While process water is dosed with various aqueous solutions containing chemical additives to assist in dust reduction, the amount of actual process water used remains very high. It is thus even another object of the invention to provide a coal dust suppression fluid which actually reduces the amount of process water needed for dust suppression.

The aforementioned and other objects of the invention can be obtained by the invention. The invention provides a novel, aqueous, coal dust suppression fluid comprising one or more surfactants and at least one high terpene-containing natural oil. Another aspect of the invention relates to a formulation for the abatement of coal dust comprising water dosed with the aforementioned aqueous dust suppression fluid. Even another aspect of the invention relates to a method for the abatement coal dust using the formulation.

The novel coal dust suppression fluid of the invention is very effective for suppressing airborne dust when used in a formulation for the abatement of coal dust.

Furthermore, the fluid can effectively assist in keeping spray nozzles and scrubber screens clean and unclogged. In addition, the coal dust suppression fluid can increase cooling efficiency when used as a heat exchange fluid by continuously clearing mineral deposits such as calcium deposits from water jackets on the underground equipment. Also, the coal dust suppression fluid can reduce the need for costly chemical additives, and can provide a coal dust suppression fluid which is less toxic to humans and is environmentally acceptable. When process water is dosed with the coal dust suppression fluid of the invention, it has also been found that the fluid can actually reduce the amount of process water needed for coal dust suppression.

DETAILED DESCRIPTION OF THE PREFERRED EMBODIMENTS

As noted above, the invention relates to a novel, aqueous, coal dust suppression fluid comprising one or more surfactants and at least one high terpene-containing natural oil. Process water can be dosed with the fluid to provide a coal dust suppression formulation. Coal dust is contacted with the formulation for the abatement of coal dust.

High terpene-containing natural oil as used herein is defined as those natural oils having a terpene content of at least 50%. It is preferable that the high terpene-containing natural oil contain at least 90% terpenes.

Suitable high terpene-containing natural oils include the citrus peel oils, preferably orange oil, grapefruit oil and lemon oil. Of these, orange oil is the most preferred as it contains about 90 to 94% terpenes and is very abundant in certain parts of the world. Pine oil is also a useful high terpene-containing natural oil.

Generally, the coal dust suppression fluid will contain about 1 to about 15% by weight high terpene-containing natural oils, preferably about 8 to about 12% by weight, and more preferably about 8 to about 10% by weight. Naturally, the amount of high terpene-containing natural oils will depend upon the amount of terpenes in the oil. For example, in the case of the preferred embodiment, orange oil, the oil can be added in an amount of from 1 to about 15% by weight, although it is preferably added in an amount of about 8 to about 10% by weight.

While not wishing to be bound by theory, it is believed that the terpenes in the natural oils provide the mechanism for obtaining many of the objects of the invention. For example, the terpenes are believed to break up oily (fatty) deposits on the coal that tend to clog spray nozzles and scrubber screens. Furthermore, the terpenes are believed to break up fatty layers on coal particles allowing the water droplets to better wet the coal particles.

In addition, because the high terpene content oils are natural oils, environmentally acceptable products are being used to dose the process water, thereby reducing process water contamination. With respect to at least orange oil, it is also believed that this oil in combination with cleaned coal particles act as a liquid ionizer. This is seen from a reduction in total dissolved solids and suspended solids which remain in the process water.

The aqueous, coal dust suppression fluid of the invention also contains at least one surfactant. Generally, conventional surfactants used in coal dust abatement can be used such as anionic and nonionic surfactants. Preferred are anionic surfactants such as salts of fatty acids, alkyl sulphates, alkyl ether sulphonates, and alkyl aryl sulphonates. Examples of preferred surfactants include sodium dodecylbenzene sulphonate, sodium lauryl ether sulphate and salts such as sodium salts of secondary alkane sulphonates (e.g., Hostaspun SAS 60 marketed by Hoechst).

Also, the use of ethoxylated nonylphenols with 8-10 moles of ethylene oxide and ethoxylated octylphenols with 8-10 moles of ethylene oxide, (e.g., alkylaryl polyglycol ether N9), in the fluid are preferred.

Generally, a large portion of the aqueous coal dust suppression fluid will comprise surfactants. For example, the fluid can contain up to about 40% by weight surfactant(s), preferably from about 15 to about 25% by weight surfactant(s), and more preferably about 20 to about 22% by weight.

The coal dust control composition of the invention may contain a variety of additives such as antioxidants and preservatives. An example of a suitable antioxidant is BHT (2,6-di-tert-butyl-para-cresol). The antioxidant(s) may be added to the composition in an amount of 0.01 to 1% by weight, preferably 0.08 to 0.12% by weight.

Examples of suitable preservatives include formaldehyde, methylparaben, propylparaben, borax, and mixtures thereof. The preservatives may be added to the composition in an amount of 0.5 to 5% by weight, preferably 0.8 to 1.2% by weight.

Since the coal dust suppression fluid is an aqueous composition, the balance of the composition will be water. Typically, the fluid will contain from about 66 to about 70% by weight water.

An example of an effective coal dust control fluid comprises 10.95% sodium dodecyl benzene sulphonate, 5.1% sodium lauryl ether sulphate, 9.1% cold pressed orange oil, 3.5% alkyl aryl polyglycolether N9, 1.4% of the sodium salt of a secondary alkane sulphonate, 1.0% formaldehyde, and 0.1% of an antioxidant; with the balance being water (all percentages are by weight).

In operation, process water will be dosed with the coal dust suppression fluid to provide a coal dust abatement formulation. Typically, process water can be dosed with the fluid at a weight ratio of about 3000:1 up to about 15000:1 (water/fluid) to provide an effective formulation for the reduction in airborne dust. More preferably, process water can be dosed with the fluid at a weight ratio of about 7000:1 up to about 9000:1.

The dust suppression fluid can be injected into a main column of process water pumped into the coal mine. The process water can be pumped by an electronically controlled pump. The metering pump can be controlled by a flow meter and control box measuring the amount of flow. The dosed process water can then be directed as needed, to various parts of the mine for dust suppression.

Another aspect of the invention provides a mechanism for dewatering coal. Once coal has been mined, it is typically sent to a preparation plant. In preparation plants, coal is sorted by various methods, such as by changing the specific gravity of fluids in which the coal is dumped. By raising or lowering of the specific gravity of those fluids, various qualities of coal can be sorted by the coal specific gravity. After the coal has been sorted, it is washed.

Among other things, process water is also removed from the coal in the preparation plants. The removal of water from the coal product in the preparation plant is one of the most economically significant steps in coal cleaning. That is, efficient dewatering is critical to ensure contract compliance, minimize transportation costs, and reduce coal handling problems, especially with respect to water freezing in storage vessels and rail cars.

There have been many mechanical techniques such as filtration and centrifugation which have been used to remove process water in preparation plants. Also, chemical techniques have been used to dewater coal. For example, surface active agents have been used to reduce water surface tension and enhance water removal from coal products.

The present invention unexpectedly provides a novel composition which can enhance water removal from mined coal products. As a chemical technique for removing water from coal at a preparation plant, the composition can be used, for example, in disc or drum filtration applications by feeding the composition directly to a slurry entering a filter vat. Or, a solution of the composition can be sprayed directly on a filter cake. Centrifugal dryer feed can be readily treated by spraying a solution of the composition onto the coal as it discharges from dewatering screens, etc.

In another and preferred embodiment of the invention, the composition can be added to the wash water. As the wash water will then have a substantially reduced surface tension, less will remain with the coal after washing. For example, by using this technique 96%, instead of 94% coal per ton of freight could be obtained for larger sizes, and 88% coal rather than 84% coal for fine coal. In a broad sense, by dosing wash water by about 7 to 50 grams per metric ton of coal to be washed with the composition according to the invention a 30 to 70% reduction in water content can be provided.

As a particularly effective embodiment of the invention, the composition can be used both in a preparation plant for dewatering applications, and for coal dust suppression. For example, dust abatement water dosed with the dust suppression fluid of the invention can also be used in preparation plant dewatering if run-off water is used.

While the invention has been described above with respect to certain particular embodiments thereof, numerous other forms and modifications will be apparent to those skilled in the art. The appended claims and the invention generally should be construed as covering all such obvious forms and modifications which are within the true spirit and scope of the invention.

What is claimed is:

1. An aqueous, coal dust suppression or coal dewatering fluid comprising one or more surfactants in an amount of from about 15 to about 25% by weight selected from fatty acids, alkyl sulphates, alkyl ether sulphonates and alkyl aryl sulphonates, and at least one high terpene-containing natural oil containing at least 90% terpenes and selected from one or more citrus peel oils, said fluid comprising amounts of said surfactant(s) and high terpene-containing natural oil(s) effective in combination for coal dust suppression or coal dewatering.

2. An aqueous fluid according to claim 1, wherein the citrus peel oil(s) is/are selected from orange oil, lemon oil and grapefruit oil.

3. An aqueous fluid according to claim 2, wherein the aqueous dust suppression fluid contains orange oil.

4. A formulation for the abatement of coal dust comprising water dosed with an aqueous coal dust suppression fluid according to claim 2, said water being dosed with the aqueous coal dust suppression fluid in an amount effective for the abatement of coal dust.

5. An aqueous fluid according to claim 1, said fluid comprising sodium dodecylbenzene sulphonate and sodium lauryl ether sulphate.

6. An aqueous fluid according to claim 1 further comprises at least one antioxidant or at least one preservative, or both.

7. A formulation for the abatement of coal dust comprising water dosed with an aqueous, coal dust suppression fluid in an amount effective for the abatement of coal dust, said aqueous, coal dust suppression fluid comprising one or more surfactants selected from fatty acids, alkyl sulphates, alkyl ether sulphonates and alkyl aryl sulphonates, and at least one high terpene-containing natural oil containing at least 90% terpenes and selected from one or more citrus peel oils, said fluid comprising amounts of said surfactant(s) and high terpene-containing natural oil(s) effective in combination for coal dust suppression.

8. A formulation for the abatement of coal dust comprising water dosed with an aqueous, coal dust suppression fluid in an amount effective for the abatement of coal dust, said aqueous, coal dust suppression fluid comprising sodium dodecylbenzene sulphonate, sodium lauryl ether sulphate and orange oil in amounts effective in combination for coal dust suppression, and said coal dust suppression fluid further comprising an antioxidant, a preservative, or both.

9. An aqueous, coal dust suppression or coal dewatering fluid comprising sodium dodecylbenzene sulphonate, sodium lauryl ether sulphate, and at least one high terpene-containing natural oil containing at least 90% terpenes and selected from one or more citrus peel oils, said fluid comprising amounts of sodium dodecylbenzene sulphonate, sodium lauryl ether sulphate, and high terpene-containing natural oil(s) effective in combination for coal dust suppression or coal dewatering.

10. A method for dewatering coal comprising applying a dewatering formulation to coal, said dewatering formulation comprising water dosed with an aqueous fluid including one or more surfactants and at least one high terpene-containing natural oil containing at least 90% terpenes and selected from one or more citrus peel oils, said aqueous fluid comprising amounts of said surfactant(s) and high terpene-containing natural oil(s) effective in combination for coal dewatering, and said water being dosed with the aqueous fluid in an amount effective for dewatering coal.

11. A method for dewatering coal according to claim 10, said surfactant(s) being selected from fatty acids, alkyl sulphates, alkyl ether sulphonates and alkyl aryl sulphonates.

12. A method for dewatering coal according to claim 11, said fluid comprising sodium dodecylbenzene sulphonate and sodium lauryl ether sulphate.

13. A method for dewatering coal according to claim 11, said fluid comprising from about 15 to about 25% by weight surfactant(s).

14. A method for dewatering coal according to claim 10, said fluid further comprising at least one antioxidant or at least one preservative, or both.

15. A method for dewatering coal according to claim 10, said fluid comprising sodium dodecylbenzene sulphonate, sodium lauryl ether sulphate and orange oil.

16. A method for dewatering coal according to claim 15, said fluid further comprising an antioxidant, a preservative, or both.

17. A method for suppressing coal dust comprising contacting coal dust with a formulation for the abatement of coal dust comprising water dosed with an aqueous, coal dust suppression fluid in an amount effective for the abatement of coal dust, said aqueous, coal dust suppression fluid comprising one or more surfactants and at least one high terpene-containing natural oil containing at least 90% terpenes and selected from one or more citrus peel oils, said fluid comprising amounts of said surfactant(s) and high terpene-containing natural oil(s) effective in combination for coal dust suppression.

18. A method for suppressing coal dust according to claim 17, said surfactant(s) being selected from fatty acids, alkyl sulphates, alkyl ether sulphonates and alkyl aryl sulphonates.

19. A method for suppressing coal dust according to claim 18, said fluid comprising sodium dodecylbenzene sulphonate and sodium lauryl ether sulphate.

20. A method for suppressing coal dust according to claim 18, said fluid comprising from about 15 to about 25% by weight 21. A method for suppressing coal dust according to claim 17, said fluid comprising sodium dodecylbenzene sulphonate, sodium lauryl ether sulphate and orange oil.

* * * * *